M. C. SCHWEINERT AND H. P. KRAFT.
PRESSURE GAGE.
APPLICATION FILED MAR. 21, 1916.
1,312,457.
Patented Aug. 5, 1919.
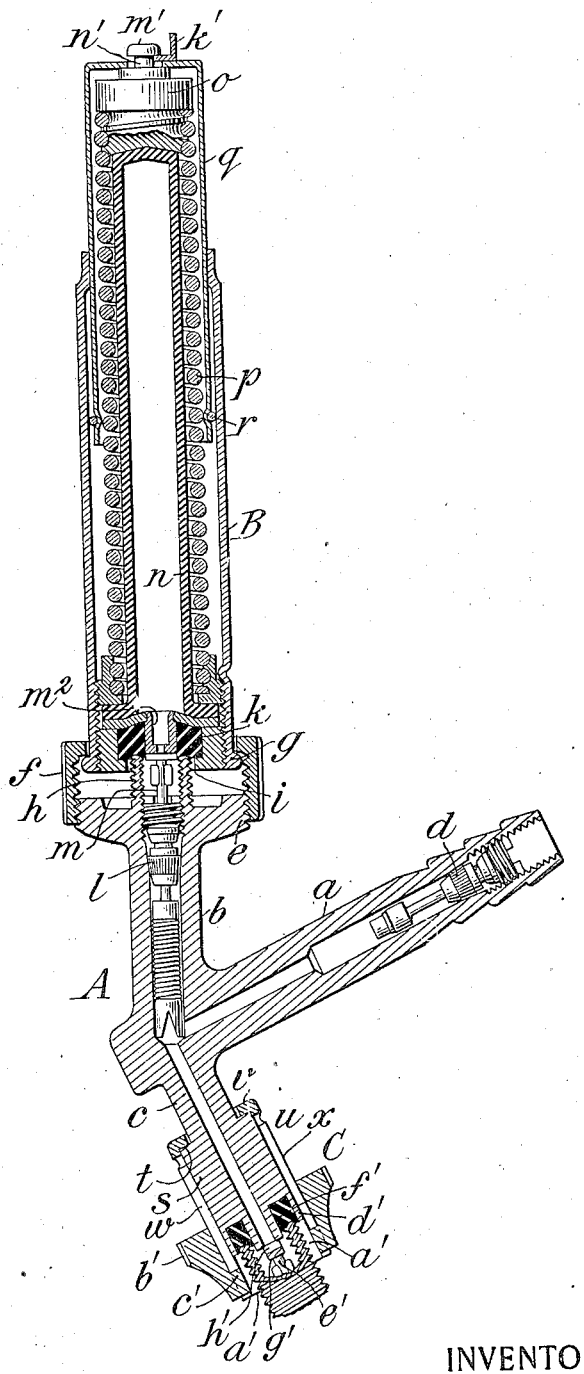
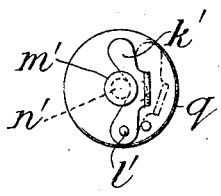
WITNESSES:
INVENTOR:
Maximilian Charles Schweinert
and Henry P. Kraft
By Attorneys,

UNITED STATES PATENT OFFICE.

MAXIMILIAN CHARLES SCHWEINERT, OF WEST HOBOKEN, AND HENRY P. KRAFT, OF RIDGEWOOD, NEW JERSEY.

PRESSURE-GAGE.

1,312,457.     Specification of Letters Patent.     Patented Aug. 5, 1919.

Original application filed June 16, 1911, Serial No. 633,598. Divided and this application filed March 21, 1916. Serial No. 85,624.

*To all whom it may concern:*

Be it known that we, MAXIMILIAN CHARLES SCHWEINERT, of West Hoboken, in the county of Hudson and State of New Jersey, and HENRY P. KRAFT, of Ridgewood, in the county of Bergen and State of New Jersey, both citizens of the United States of America, have invented certain new and useful Improvements in Pressure-Gages, of which the following is a specification.

This invention relates to pressure gages, and aims to provide certain improvements therein. The invention is particularly applicable to pressure gages for use in connection with pneumatic tires. The object of the invention is to provide an attachment to a registering gage, whereby the registering feature may be temporarily suspended. The invention is particularly useful for a pressure gage adapted to be used in connection with tire inflating means including a pump or tank, although it is not limited in its application to such use.

The present invention is a division of our former application for patent, Serial No. 633,598, filed June 16, 1911.

In the drawings accompanying this application we have illustrated the said invention as applied to a registering gage and used with a pump connection. In the said drawings,—

Figure 1 is a side elevation partly in vertical section showing the invention as applied to a registering gage, together with a form of connection suitable for use in connection with pumps or inflating tanks.

Fig. 2 is an enlarged vertical section of Fig. 1.

Fig. 3 is a plan of the top of the gage shown in Figs. 1 and 2 illustrating our invention.

The gage B is preferably of a construction illustrated in several applications heretofore filed by Maximilian C. Schweinert and Henry P. Kraft. The pressure responsive member of the gage preferably comprises a rubber tube $n$ closed at its outer end, a plunger $o$ against which the end of the tube $n$ bears, and a spring $p$ connected to the plunger $o$ and the bottom of the casing so that the pressure in the tube $n$ raises the plunger against the tension of the spring. The gage is also provided with a sleeve $q$ against the under side of which the plunger $o$ bears so that the sleeve is moved upwardly when the plunger rises. Normally there is no connection between the plunger and sleeve so that the sleeve remains in the outermost position to which it is forced by the plunger by friction, the plunger retiring when the pressure is relieved. A friction ring $r$ is usually provided to hold the sleeve more positively in its positions.

When the gage B is used with a connection of the type illustrated to which is joined a pump or tank the influx of air is apt to raise the plunger $o$ of the gage to a point beyond the proper normal pressure. In order that the sleeve $q$ or other indicating member may return with the plunger and finally reach the proper pressure, means are provided to connect the plunger with the indicating member, and such means which form the present invention are best shown in Figs. 2 and 3. These means comprise preferably a catch $k^1$ which is shown as pivoted at $l^1$ to the top part of the sleeve $q$. The catch is designed to engage a stud $m^1$ or other suitable member carried upon the plunger $o$. As shown the stud is fixed to the upper part of the plunger and is provided with a neck $n^1$ into which the catch $k^1$ fits. Normally the stud $m^1$ upon the expansion of the tube $n$ will engage the sleeve $q$ and carry the same to the extreme limit of movement of the said tube where the sleeve will be retained by the friction ring $r$, and upon a reduction in pressure the tube will shrink and the plunger $o$ will be carried in with it, the stud $m^1$ in that case passing freely through an opening $q^1$ in the top of the sleeve. At this time the catch $k^1$ will be in the dotted line position shown in Fig. 3. When it is desired however, that the indicator $q$ shall return, the catch $k^1$ may be thrown to the full line position of Fig. 3 locking the plunger $o$ and the sleeve together so that the indicating sleeve $q$ will not remain in extended position.

The invention is illustrated as employed in connection with a pressure gage of a particular type, but it is not limited in employment to such type of gage but may be used with other types.

The invention is particularly useful when the pressure gage to which it is attached is used with a pump connection by reason of the fact already stated. Accordingly, we have illustrated the invention as so employed. A brief description of these parts in connection with which our invention is illustrated is as follows: The connection as a whole is designated A and to this is attached the gage B and coupling C for connection to a tire valve or the like.

The connection A preferably consists of a member having three branches $a$, $b$ and $c$, all of which are tubular and designed to carry air under pressure. One of the branches $a$ is adapted to be connected with a tube or hose leading from the pump or tank. It is preferably provided with a check valve $d$ designed to prevent back pressure from the tire to the pump or tank.

The branch $b$ is adapted for connection to the gage B. For this purpose it is provided with an enlarged collar or flange $e$, screw-threaded on its outer face and having an exterior diameter enlarged to receive a coupling $f$ engaging a flange $g$ on the lower part of the gage B. Beyond the flange $e$ the branch $b$ is provided with an upwardly extending nipple $h$ which is screw-threaded on its exterior and interior surfaces. The nipple $h$ is of approximately the same diameter as the end of the tire valve, and is adapted to fit in a lower opening $i$ of the gage and contact with a packing $k$ of the latter when the coupling is tightened on the flange $e$.

Within the extension $b$ and preferably near the end of the nipple $h$ is located a check valve $l$, the deflating pin $m$ of which is arranged in such relation to the end of the nipple that it is engaged by the deflator $m^2$ of the gage, thus permitting air within the branch $b$ to pass upwardly into the gage.

The coupling C is constructed so that it may be quickly and easily attached to and detached from a tire valve or the like. To this end the branch $c$ is provided with an enlarged outer portion $s$, the inner end of which is formed with a shoulder $t$. Surrounding the portion $s$ and swiveled thereto is a split tubular member $u$ having at its inner end a flange $v$ engaging the shoulder $t$, which flange is turned down into place after the parts are united. The member $u$ is formed with a series of slots $w$ preferably extending from the outer end of the tubular member to a point near the flange $v$, so as to provide in effect a series of spring arms $x$ which preferably normally have a tendency to spring outward. Each of the arms is provided at its outer end with a screw-threaded portion $a'$ designed to engage the exterior screw-thread of a tire valve. Surrounding the member $u$ is a sliding collar $b'$ which is preferably formed on its inner side with a series of projections $c'$ designed to enter into the slots $w$. When the sliding collar $b'$ is pushed inwardly the spring arms are free to move outwardly to such an extent that their screw-threaded portions will pass over the screw-threaded exterior of the valve shell, so that the latter may enter in between the arms. When the collar is pushed outwardly toward the end of the member $u$ the diameter of the effective opening in the outer end of the member $u$ is so reduced that the threads of the latter engage the threads of the valve shell. By rotating the collar $b'$ (and with it the member $u$) a short distance a firm connection is made with the valve shell. The enlarged end $s$ of the branch $c$ is provided with a packing washer $d'$ which is designed to contact with the outer end of the valve shell to make a leak-tight joint between the parts. The enlarged portion $s$ is formed with an annular recess adapted to receive the washer. The portion $s$ is also provided with a deflating means for pressing down the valve stem $e'$ of the tire valve. Such means are shown as comprising a tubular nipple $f'$ formed integrally upon the portion $s$ and bored to near its outer end, where it is provided with a projection $g'$ adapted to contact with the deflating pin $e'$. The nipple is provided with a passage or passages $h'$ through which the air can reach the bore of the branch $c$. By this construction the pump connection may be very quickly and firmly attached to the tire valve with a leak-tight joint. The packing is carried upon a fixed part, and the deflator is also fixed to and preferably forms a part of the branch $c$ whereby simplicity and economy are obtained.

The connection A is illustrated as having a branch $b$ which is angularly arranged with relation to the branch $a$ so that the gage may be brought outside of the plane of the wheel. In the usual size of automobile wheel there is usually not room to accommodate the gage between the spokes of the wheel, and the angular relation hence permits the use of a gage with longer dimensions than would sometimes otherwise be possible.

The construction of the connection illustrated is not claimed herein as the same forms part of the invention claimed in the application of which this is a division, nor is the construction of the gage claimed herein.

The invention is shown as applied to a gage of a particular type used with a connection especially adapted to indicate pressure in a tire inflating device, and accordingly it is illustrated as having a branch for connection to a tire and another branch for connection to a pump or compressed air tank. The invention however is not so limited but may within the limits of the appended claims be used in connection with another type of gage, or it may be attached to the gage irrespective of the employment of the latter with the connection illustrated, or it may be used with any other connection adapted to accomplish this or other purpose.

We do not claim broadly herein the construction wherein the indicator member $q$ is made attachable to and detachable from the pressure responsive member, as this construction is broadly claimed in the application of Maximilian Charles Schweinert, Serial No. 631,059, filed June 3, 1911.

What we claim is:—

1. In a device of the character described, a gage having a part responsive to variations of pneumatic pressure, an indicating member normally disconnected therefrom, and means for connecting said indicating member to said part, said means comprising a catch device.

2. In a device of the character described, a gage having a part responsive to variations of pneumatic pressure, an indicating member normally disconnected therefrom, and means for connecting said indicating member to said part, said means comprising a pivoted catch device.

3. In a device of the character described, a gage having a part responsive to variations of pneumatic pressure, an indicating member normally disconnected therefrom, and means for connecting said indicating member to said part, said means comprising a stud carried by said part, and a catch device carried by said indicating member.

4. In a gage of the character described, a member responsive to variations of static pneumatic pressure, an indicating member actuated thereby, said pressure-responsive member and indicating member being adapted to maintain a fixed relative position during indicating movements of the gage, and a quickly actuated means for connecting said indicating and pressure-responsive members and disconnecting the same, said connecting means acting invariably to connect said members only in said fixed relative position, whereby, when connected, the indicating member is always in proper indicating relation to the pressure-responsive member.

5. In a gage of the character described, a pneumatically movable part, an indicating member actuated thereby, and a catch device operable by the user to connect or disconnect said indicating member and said pneumatically movable part.

In witness whereof, we have hereunto signed our names in the presence of two subscribing witnesses.

MAXIMILIAN CHARLES SCHWEINERT.
HENRY P. KRAFT.

Witnesses:
E. V. MYERS,
T. F. WALLACE.